US008805030B2

(12) United States Patent
Snoek

(10) Patent No.: US 8,805,030 B2
(45) Date of Patent: Aug. 12, 2014

(54) METHOD FOR AUTOMATED CATEGORIZATION OF HUMAN FACE IMAGES BASED ON FACIAL TRAITS

(75) Inventor: Cornelis Gerardus Maria Snoek, Volendam (NL)

(73) Assignee: Euvision Technologies B.V., Amsterdam (NL)

( * ) Notice: Subject to any disclaimer, the term of this patent is extended or adjusted under 35 U.S.C. 154(b) by 287 days.

(21) Appl. No.: 13/149,765

(22) Filed: May 31, 2011

(65) Prior Publication Data
US 2011/0299764 A1      Dec. 8, 2011

(30) Foreign Application Priority Data

Jun. 7, 2010   (NL) .................................... 2004829

(51) Int. Cl.
*G06K 9/00*      (2006.01)
*G06F 17/30*     (2006.01)

(52) U.S. Cl.
CPC ............................... *G06F 17/30256* (2013.01)
USPC ........................................................ 382/118

(58) Field of Classification Search
USPC ................................................. 382/118, 181
See application file for complete search history.

(56) References Cited

U.S. PATENT DOCUMENTS

| 2003/0202704 | A1* | 10/2003 | Moghaddam et al. | 382/224 |
| 2009/0003660 | A1* | 1/2009 | Das | 382/118 |
| 2009/0074259 | A1* | 3/2009 | Baltatu et al. | 382/118 |
| 2009/0196464 | A1* | 8/2009 | Dimitrova et al. | 382/118 |
| 2009/0245573 | A1* | 10/2009 | Saptharishi et al. | 382/103 |

OTHER PUBLICATIONS

Dutch Search Report and the Written Opinion for Counterpart Application No. NL2004829, 10 pgs (Jan. 18, 2011).
Jakob Verbeek and Cordelia Schmid, "Lecture 2: Bag of features for category recognition," XP002616094, Machine Learning and Category Representation 2009-2010, Course at ENSIMAG, [online], Slides 1-57 (Dec. 2009).
Jakob Verbeek and Cordelia Schmid, "Lecture 3: Local invariant features," XP002616095, Machine Learning and Category Representation 2009-2010, Course at ENSIMAG, [online], Slides 1-62 (Dec. 2009).
Matthew Collins, et al., "Full body image feature representations for gender profiling," XP031664497, IEEE 12th International Conference on Computer vision Workshops 2009, pp. 1235-1242, (Sep. 27 to Oct. 4, 2009).
Zisheng Li, et al., "Facial=component-based Bag of Words and PHOG Descriptor for Facial Express Recognition," XP031574894, IEEE International Conference on Systems, Man and Cybernetic 2009, pp. 1353-1358 (Oct. 11, 2009).
Marcin Marszalek, et al., "Learning Representations for Visual Object Class Recognition," XP002616098, [online], http://pascallin.ecs.soton.ac.uk/challenges/VOC/voc2007/workshop/marszalek.pdf, Slides 1-20 (Oct. 15, 2007).
H. Bay, A. Ess, T. Tuytelaars, and L. Van Gool, "Speeded-up Robust Features (SURF)," Computer Vision and Image Understanding, vol. 110, No. 3, pp. 346-359 (Sep. 10, 2008).
C.-C. Chang and C.-J. Lin, "LIBSVM: A Library for Support Vector Machines," Software available at http://www.csie.ntu.edu.tw/~cjlin/libsvm, pp. 1-39 (2001).
R. Chellappa, P. Sinha, and P.J. Phillips, "Face Recognition by Computers and Humans," IEEE Computer Society, vol. 43 No. 2, pp. 46-55 (Feb. 2010).
J.C. van Gemert, C.G.M. Snoek, C.J. Veenman, A.W.M. Smeulders, and J.-M. Geusebroek, "Comparing Compact Codebooks for Visual Categorization," Computer Vision and Image Understanding, vol. 114, No. 4, pp. 450-462 (2010).
J.C. van Gemert, C.J. Veenman, A.W.M. Smeulders, and J. M. Geusebroek,"Visual word ambiguity," IEEE Transactions on Pattern Analysis and Machine Intelligence, vol. 32, No. 7, pp. 1271-1283 (2010).
S. Gutta, J.R.J. Huang, P. Jonathon Philips, and H. Wechsler, "Mixture of experts for classification of gender, ethnic origin, and pose of human faces," IEEE Transactions on Neural Networks, vol. 11, No. 4, pp. 948-960 (Jul. 2000).
G.B. Huang, V. Jain, and E. Learned-Miller, "Unsupervised joint alignment of complex images," In Proceedings of the International Conference on Computer Vision, 8 pgs. (2007).
N. Kumar, P.N. Belhumeur, and S.K. Nayar, "FaceTracer: A Search Engine for Large Collections of Images with Faces," In Proceedings of the European Conference on Computer Vision, pp. 340-353, (2008).
S. Lazebnik, C. Schmid, and J. Ponce, "Beyond bags of features: Spatial pyramid matching for recognizing natural scene categories," In Proceeding of the 2006 IEEE Computer Society Conference on Computer Vision and Pattern Recognition (CVPR'06), pp. 2169-2178 (2006).
T. Leung and J. Malik, "Representing and Recognizing the Visual Appearance of Materials using Three-dimensional Textons," International Journal of Computer Vision, vol. 43, No. 1, pp. 29-44, 2001.
D.G. Lowe, "Distinctive image features from scale-invariant keypoints," International Journal of Computer Vision, vol. 60, pp. 91-110 (Jan. 5, 2004).
E. Makinen, and R. Raisamo, "Evaluation of Gender Classification Methods with Automatically Detected and Aligned Faces," IEEE Transactions on Pattern Analysis and Machine Intelligence, vol. 30, No. 3, pp. 541-547 (Mar. 2008).

(Continued)

*Primary Examiner* — Hadi Akhavannik
(74) *Attorney, Agent, or Firm* — Blakely, Sokoloff, Taylor & Zafman LLP

(57) ABSTRACT

A method for automated categorization of human face images based on facial traits, said method comprising a facial trait extracting phase, comprising the steps of: providing a multitude of images comprising human faces, for each image sampling a multitude of points in said image to obtain point sample data, for each sampled point extracting visual features from said point sample data, for each image assigning said visual features to predefined codewords by applying a codebook transform, for each image extracting facial traits by applying a kernel-based learning method's prediction algorithm to said codewords to establish the probability that a facial trait from a predefined set of facial traits is present in said image, and extract said facial trait for said image if said probability is higher than a predefined threshold.

12 Claims, No Drawings

(56) References Cited

OTHER PUBLICATIONS

M. Marszalek, C. Schmid, H. Harzallah, and J. van de Weijer. Learning representations for visual object class recognition, Lear, Inria Grenoble, Rhone-Alpes, France, (Oct. 15, 2007).

B. Moghaddam and M.-H, Yang, "Learning gender with support faces," IEEE Transactions on Pattern Analysis and Machine Intelligence, vol. 24, No. 5, pp. 707-711 (May 2002).

F. Moosmann and E. Nowak and F. Jurie, Randomized Clustering Forests for Image Classification, IEEE Transactions on Pattern Analysis and Machine Intelligence, vol. 30, No. 9, pp. 1632-1646, (Sep. 2008).

M. Pantic and L.J.M. Rothkrantz, "Automatic Analysis of Facial Expressions: The State of the Art," IEEE Transactions on Pattern Analysis and Machine Intelligence, vol. 22, No. 12, pp. 1424-1445, (Dec. 2000).

K.E.A. van de Sande, T. Gevers, and C.G.M. Snoek, "Evaluating color descriptors for object and scene recognition," IEEE Transactions on Pattern Analysis and Machine Intelligence, vol. 32, No. 9, pp. 1582-1596 (Sep. 2010).

J. Sivic and A. Zisserman, "Video Google: A Text Retrieval Approach to Object Matching in Videos," In Proceedings of the Ninth IEEE International Conference on Computer Vision (ICCV'03), 8 pgs.

A.W.M. Smeulders, M. Worring, S. Santini, A. Gupta, and R. Jain, "Content Based Image Retrieval at the End of the Early Years," IEEE Transactions on Pattern Analysis and Machine Intelligence, vol. 22, No. 12, pp. 1349-1380 (Dec. 2000).

C.G.M. Snoek, et al., "The MediaMill TRECVID 2008 Semantic Video Search Engine," In Proceedings of the 6th TRECVID Workshop, Gaithersburg, USA, 14 pgs. (2008).

U. Park, Y. Tong, and A.K. Jain, "Age-Invariant Face Recognition," IEEE Transactions on Pattern Analysis and Machine Intelligence, vol. 32, No. 5, pp. 947-954 (May 2010).

M. Toews and T. Arbel, "Detection, Localization, and Sex Classification of Faces from Arbitrary Viewpoints and under Occlusion," IEEE Transactions on Pattern Analysis and Machine Intelligence, vol. 31, No. 9, pp. 1567-1581 (Sep. 2009).

T. Tuytelaars and K. Mikolajczyk, "Local invariant feature detectors: A survey," Foundations and Trends in Computer Graphics and Vision, vol. 3, No. 3, pp. 177-280 (2008).

M.-H. Yang and D.J. Kriegman and N. Ahuja, "Detecting Faces in Images: A Survey," IEEE Transactions on Pattern Analysis and Machine Intelligence, vol. 24, No. 1, pp. 34-58 (Jan. 2002).

J. Zhang, M. Marszalek, S. Lazebnik, and C. Schmid, "Local features and kernels for classification of texture and object categories: A comprehensive study," International Journal of Computer Vision, vol. 73, No. 2, pp. 213-238 (2006).

W. Zhao and R. Chellappa and P.J. Phillips and A. Rosenfeld, "Face Recognition: A Literature Survey," ACM Computing Surveys, vol. 35, No. 4, pp. 399-458 (Dec. 2003).

\* cited by examiner

METHOD FOR AUTOMATED CATEGORIZATION OF HUMAN FACE IMAGES BASED ON FACIAL TRAITS

The invention relates to a method for automated categorization of human face images based on facial traits. The expression facial traits in this respect includes hair traits.

BACKGROUND OF THE INVENTION

Human interaction is critically dependent on mankind's ability to process faces, in terms of sex, age, emotion, ethnic origin, identity, and so on. Many applications exist, and several new ones can be conceived, which need to process, interpret, monitor, and react in response to an observable facial trait. Areas of interest are as diverse as entertainment, marketing, law enforcement, health, and security. Hence, it is no wonder that automated methods for detection, recognition, and description of facial images have been studied for a long time in computer science.

Face detection techniques aim to identify all image regions which contain a face, regardless of its three-dimensional position, orientation, and lighting conditions used, and if present return their image location and extents. Over the years various robust methods for the detection of (frontal) faces in images and video have been reported, see [YANG02] for a comprehensive and critical survey of face detection methods. When a (frontal) face is detected in an image, face recognition techniques aim to identify the person [ZHAO03]. Early face recognition methods emphasized matching face images by means of subspace methods such as principal component analysis, linear discriminant analysis and elastic graph matching [CHEL10]. For non-frontal faces, 3D morphable model-based approaches have been proposed which consistently outperform subspace methods on controlled datasets. Yet, recognition of faces in unconstrained environments remains a research challenge for the years to come.

Compared to the vast literature on face detection and recognition, research aiming for the description of face images in terms of their visual appearance, e.g., whether the person is from Asian origin, female, wears glasses, smiles, or is a teenager, is modest. Some methods have appeared which aim for categorization of face images in terms of gender [MOGH02, MAKI08, TOEW09], others have focused on age [PARK10], or ethnic origin [GUTT00], while yet another paper considers facial expression [PANT00]. The general approach in these methods is to rescale a detected face to a thumbnail image, describe the thumbnail in terms of visual features, such as pixel intensity, texture or a tuned 3D face model, and to learn the visual trait of interest with the help of labeled examples and machine learning software like support vector machines or AdaBoost. A clear limitation of all these approaches is their lack of generalization. For every visual trait one can think of, a separate visual feature tuned to the trait of interest needs to be crafted carefully.

Some researchers have indeed followed this approach and define a mixture of different visual features as input to a support vector machine, which learns what features to select for assigning specific visual traits to face images. A good example is [KUM08], where the authors break up the face into a number of regions corresponding to hair area, forehead, nose, eyes, etc. Each region is described using a mixture of color, intensity, and edge features which can all be normalized and aggregated, if the support vector machine decides to do so. Naturally this bottom-up approach depends on careful alignment of facial images to prevent that the nose area of the one person is compared with the forehead of another.

The current invention proposes a new process which is able to categorize a human face image according to observable visual traits in a generic fashion. Examples include, but are not limited to: gender, race, age, emotion, facial (hair) properties, abnormalities, and presence of religious, medical, or fashion elements such as hats, scarves, glasses, piercings, and tattoos.

SUMMARY OF THE INVENTION

According to the invention the method for automated categorization of human face images based on facial traits, said method comprises a facial trait extracting phase, comprising the steps of: providing a multitude of images comprising human faces, for each image sampling a multitude of points in said image to obtain point sample data, for each sampled point extracting visual features from said point sample data, for each image assigning said visual features to predefined codewords by applying a codebook transform, for each image extracting facial traits by applying a kernel-based learning method's prediction algorithm to said codewords to establish the probability that a facial trait from a predefined set of facial traits is present in said image, and extract said facial trait for said image if said probability is higher than a predefined threshold. Said kernel-based learning method's prediction algorithm uses facial trait training data obtained in a preceding learning phase.

Codebook transforms have been used for some time already in a different technical field, i.e. methods for object and scene categorization in images, as for instance described in [LEUN01] of 2001 and [SIVI03] of 2003. It is also described in [SNOE08], which draws inspiration from the bag-of-words approach propagated by Schmid and her associates [ZHAN07,MARS07,LAZE06], as well as recent advances in keypoint-based color descriptors [SAND10] and codebook representations [GEME10a,GEME10b]. The use of codebook transforms as an intermediate step in the extraction of facial traits makes it possible to use a generic algorithm for a multitude of facial traits, without the need for location detection.

Preferably obtaining said point sample data is achieved by using an interest point detector such as a Harris-Laplace detector, a dense point detector and/or spatial pyramid weighting. Preferably extracting visual features from said point sample data is achieved by detecting SIFT, OpponentSIFT and/or SURF features in said point sample data. Preferably said kernel-based learning method algorithm is a support vector machine, preferably a LIBVSM support vector machine with $\chi^2$ kernel. Preferably said codebook transform uses between 100 and 1,000,000 codewords, preferably between 100 and 100,000 codewords, more preferably between 100 and 4,000 codewords. Preferably said points in said images are pixels of a digital image or a video frame.

Preferably said method further comprises the step of detecting a face in said image, and cropping said image around said face and/or rotating said image to align said face with faces in the other images in said multitude of images.

Preferably said method further comprises the step of labelling said images with said extracted facial traits and/or sorting said images based on said extracted facial traits, after said facial traits have been extracted.

In order to set up or extend a system for automated categorization of human face images, said method preferably includes a learning phase preceding said facial trait extraction phase, comprising the steps of: providing a learning multitude of digital images comprising human faces, each of said images having a similar facial trait that is to be used to categorize images in said multitude of images in said facial trait extraction phase, for each image sampling a multitude of points in said image to obtain point sample data, for each sampled point extracting visual features from said point sample data, for each image assigning said visual features to predefined codewords by applying a codebook transform, for each image applying said kernel-based learning method's training algorithm to said codewords for said facial trait. Preferably said learning phase is repeated for a multitude of facial traits that are to be used to categorize images in said multitude of images in said facial trait extraction phase.

The invention also relates to a computer software program arranged to run on a computer to perform the steps of the method of the invention, and to a computer readable data carrier comprising a computer software program arranged to run on a computer to perform the steps of the method of the invention, as well as to a computer comprising a processor and electronic memory connected thereto loaded with a computer software program arranged to perform the steps of the method of the invention.

DETAILED DESCRIPTION OF THE PREFERRED EMBODIMENT

The process first detects a face in an image and samples points on and around the detected face. Then, every point is described by the same invariant visual feature set. The resulting point feature set is reduced with the help of a codebook transformation to a fixed-size codeword histogram. This histogram, together with face labels for training, forms the input for a kernel-based machine learning algorithm. Finally, during testing, the process assigns facial trait probabilities to previously unlabeled face images. The process deliberately ignores detailed geometry and specific facial regions. The process exploits the same set of visual features, computed over the localized faces only, which allows us to categorize human face images based on any observable trait without the need for implementing specialized detectors.

The process perceives categorization of faces in terms of observable traits as a combined computer vision and machine learning problem. Given an n-dimensional visual feature vector $x_i$, representing face image i, the aim is to obtain a measure, which indicates whether facial trait $\omega_j$ is present in face i. The process may choose from various visual feature extraction methods to obtain $x_i$, and from a variety of supervised machine learning approaches to learn the relation between $\omega_j$ and $x_i$. The supervised machine learning process is composed of two phases: training and testing. In the first phase, the optimal configuration of features is learned from the training data. In the second phase, the classifier assigns a probability $p(\omega_j|x_i)$ to each input feature vector for each face property.

The process details the generic categorization scheme for facial traits by presenting a component-wise decomposition. The process follows the image data as they flow through the computational process, as summarized in the next paragraph, and detailed per component next.

The process is able to categorize a human face image according to observable semantic features in a generic fashion. Examples include gender, race, age, facial (hair) properties, abnormalities, and presence of religious, medical, or fashion elements such as hats, scarves, glasses, piercings, and tattoos. The process first detects and localizes a face in an image. Then the face image is aligned to assure a canonical pose. From the canonical face pose, points are sampled on and around the face. Then, every point is described by the same invariant visual feature set. The resulting point feature set is reduced with the help of a codebook transformation to a fixed-size codeword histogram. This histogram, together with face labels for training, forms the input for a kernel-based machine learning algorithm. The process then assigns facial trait probabilities to previously unlabeled face images, and labels the images accordingly.

Face Detection:

The process employs an off-the-shelf face detector for localizing faces in images. The process is suited for frontal faces or profile faces. Once a face is detected and localized in the image, the process segments a bounding box around the detected face. This face image is transferred to the face alignment stage.

Face Alignment:

The detected faces are not necessarily aligned into the same pose. However, since unaligned faces may introduce unwanted variability, it is well known that categorization performance benefits when faces are transferred into the same canonical pose. Several methods for face alignment exist, e.g., congealing, active appearance models, active wavelet networks, and so on. Preferably an unsupervised technique is used which is able to align face images under complex backgrounds, lighting, and foreground appearance, as described in [HUAN07].

Point Sampling:

The visual appearance of a observable trait in face images has a strong dependency on the spatio-temporal viewpoint under which it is recorded. Salient point methods such as [TUYT08] introduce robustness against viewpoint changes by selecting points, which can be recovered under different perspectives. Another solution is to simply use many points, which is achieved by random or dense sampling.

Interest Point Detector:

In order to determine salient points in the face, interest point detectors like Harris-Laplace rely on a Harris corner detector. By applying it on multiple image scales, it is possible to select the characteristic scale of a local corner using the Laplacian operator as described in [TUYT08]. Hence, for each visible corner in the face image, the Harris-Laplace detector selects a scale-invariant point if the local image structure under a Laplacian operator has a stable maximum.

Dense Point Detector:

For homogenous facial areas, like the cheeks, corners are often rare. Hence, for these properties relying on an interest point detector can be suboptimal. To counter the shortcoming of interest points, random and dense sampling strategies have been proposed. The process employs dense sampling, which samples an image grid in a uniform fashion using a fixed pixel interval between regions. In our experiments the process uses an interval distance of 2 pixels and sample at multiple scales.

Spatial Pyramid Weighting:

Both interest points and dense sampling give an equal weight to all keypoints, irrespective of their spatial location in the facial image. In order to overcome this limitation, the process incorporates the approach suggested by Lazebnik et al. [LAZE06] for scene categorization, and sample fixed subregions of a face image, e.g., 1×1, 2×2, 4×4, and so on. The process aggregates the different resolutions into a so called spatial pyramid, which allows for region-specific weighting. Since every region is an image in itself, the spatial pyramid can be used in combination with both interest point detectors and dense point sampling. The process uses a spatial pyramid of 1×1, 2×2, 3×1, 1×3, 5×1, and 1×5 regions in our experiments.

Visual Feature Extraction:

Varying the scale, viewpoint, lighting and other circumstantial conditions in the recording of a face will deliver different data, whereas the semantics has not changed. Hence, the process needs visual features minimally affected by accidental recording circumstance, while still being able to distinguish faces with different semantics. Some form of invariance is required, as described in [SMEU00], such that the feature is tolerant to the accidental visual transformations. To put it simply, an invariant visual feature is a computable visual property that is insensitive to changes in the content, for example caused by changing the illumination color, illumination intensity, rotation, scale, translation, or viewpoint.

Features become more robust when invariance increases, but they lose discriminatory power. Hence, effective visual features strike a balance between invariance and discriminatory power. Good features are local invariant descriptors such as the SIFT feature proposed by Lowe [LOWE04], which describes the local shape of a region using edge orientation histograms. As SIFT relies on intensity only, many color variants have been proposed recently, which include OpponentSIFT, CSIFT, rgSIFT, and RGB-SIFT [SAND10]. OpponentSIFT, for example, describes all the channels in the opponent color space using SIFT features. The information in the $O_3$ channel is equal to the intensity information, while the other channels describe the color information in the face image. The feature normalization, as effective in SIFT, cancels out any local changes in light intensity. Another robust invariant local descriptor is SURF [BAY08], which replaces the gradient with first order Haar wavelet responses in x and y direction, exploits integral images for efficiency, and uses only 64 instead of 128 dimensions.

In the preferred embodiment the process computes the OpponentSIFT visual features around salient points obtained from the Harris-Laplace detector and dense sampling. For all visual features the process employs a set of spatial pyramids.
Codebook Transform:

To avoid using all visual features in an image, while incorporating translation invariance and a robustness to noise, the process follows the codebook approach, which is well known in object and scene categorization since 2001 [LEUN01, SIVI03] but never used for categorizing face images according to observable visual traits. First, the process assigns visual features to discrete codewords predefined in a codebook. Then, the process uses the frequency distribution of the codewords as a compact feature vector representing a face image. Three important variables in the codebook representation are codebook construction, codeword assignment, and codebook size.

An extensive comparison of codebook representation variables is presented by Van Gemert et al. [GEME10a, GEME10b]. Choices include the quantization method used, such as k-means clustering, vocabulary trees [MOOS08], and so on, the codeword assignment, e.g., using a hard or soft variants, and the codebook size, ranging from a hundred to a million codewords. Preferably the process employs codebook construction using k-means clustering in combination with hard codeword assignment and a maximum of 4,000 codewords.
Kernel-Based Learning:

Learning facial traits from codeword histograms is achieved by kernel-based learning methods. Similar to the state-of-the-art, the process uses the support vector machine framework as described in [VAPN00] for supervised learning of facial traits. Preferably the process uses the LIBSVM implementation as described in [CHAN01] with probabilistic output. While the radial basis kernel function usually performs better than other kernels, it was recently shown by Zhang et al. in [ZHAN07] that in a codebook-approach the earth movers distance and $\chi^2$ kernel are to be preferred. In general, the process obtains good parameter settings for a support vector machine, by using an iterative search on both C and kernel function K(•) on cross validation data. From all parameters q the process selects the combination that with the best average precision performance, yielding q*. The process measures performance of all parameter combinations and selects the combination with the best performance. The process uses a 3-fold cross validation to prevent over-fitting of parameters. The result of the parameter search over q is the improved model $p(\omega_j|x_i, q^*)$, contracted to $p^*(\omega_j|x_i)$, which the process uses to fuse and to rank facial trait recognition results.

It will be appreciated by those skilled in the art that changes can be made to the preferred embodiment described above without departing from the broad inventive concept thereof. It is understood, therefore, that this invention is not limited to the particular embodiments disclosed, but it is intended to cover modifications within the spirit and scope of the present invention as defined by the appended claims.

The following publications are incorporated herein by reference as indicated in the above description:

[BAY08] H. Bay, A. Ess, T. Tuytelaars, L. Van Gool. SURF: Speeded Up Robust Features. Computer Vision and Image Understanding, 110(3):346-359, 2008.

[CHAN01] C.-C. Chang and C.-J. Lin. LIBSVM: a library for support vector machines, 2001. Software available at http://www.csie.ntu.edu.tw/~cjlin/libsvm/.

[CHEL10] R. Chellappa, P. Sinha, and P. J. Phillips. Face Recognition by Computers and Humans. IEEE Computer, 43(2):46-55, 2010.

[GEME10a] J. C. van Gemert, C. G. M. Snoek, C. J. Veenman, A. W. M. Smeulders, and J.-M. Geusebroek. Comparing Compact Codebooks for Visual Categorization. Computer Vision and Image Understanding, 114(4):450-462, 2010.

[GEME10b] J. C. van Gemert, C. J. Veenman, A. W. M. Smeulders, and J. M. Geusebroek. Visual word ambiguity. IEEE Trans. Pattern Analysis and Machine Intelligence, 32(7):1271-1283, 2010.

[GUTT00] S. Gutta, J. R. J. Huang, P. Jonathon Philips, and H. Wechsler. Mixture of experts for classification of gender, ethnic origin, and pose of human faces. IEEE Trans. Neural Networks, 11(4): 948-960, 2000.

[HUAN07] G. B. Huang, V. Jain, and E. Learned-Miller. Unsupervised joint alignment of complex images. In Proc. International Conference on Computer Vision, 2007

[KUMA08] N. Kumar, P. N. Belhumeur, and S. K. Nayar. FaceTracer: A Search Engine for Large Collections of Images with Faces. In Proc. European Conference on Computer Vision, pp.340-353, 2008

[LAZE06] S. Lazebnik, C. Schmid, and J. Ponce. Beyond bags of features: Spatial pyramid matching for recognizing natural scene categories. In Proc. IEEE Computer Society Conference on Computer Vision and Pattern Recognition, volume 2, pages 2169-2178, New York, USA, 2006.

[LEUN01] T. Leung and J. Malik. Representing and Recognizing the Visual Appearance of Materials using Three-dimensional Textons. Int'l J. Computer Vision, 43(1):29-44, 2001.

[LOWE04] D. G. Lowe. Distinctive image features from scale-invariant keypoints. Int'l J. Computer Vision, 60:91-110, 2004.

[MAKI08] E. Makinen, and R. Raisamo. Evaluation of Gender Classification Methods with Automatically Detected and Aligned Faces. IEEE Trans. Pattern Analysis and Machine Intelligence, 30(3):541-547, 2008.

[MARS07] M. Marszalek, C. Schmid, H. Harzallah, and J. van de Weijer. Learning object representations for visual object class recognition, October 2007. Visual Recognition Challenge workshop, in conjunction with ICCV.

[MOGH02] B. Moghaddam and M.-H, Yang. Learning gender with support faces. IEEE Trans. Pattern Analysis and Machine Intelligence, 24(5):707-711, 2002.

[MOOS08] F. Moosmann and E. Nowak and F. Jurie. Randomized Clustering Forests for Image Classification. IEEE Trans. Pattern Analysis and Machine Intelligence, 30(9): 1632-1646, 2008.

[PANT00] M. Pantic and L. J. M. Rothkrantz. Automatica Analysis of Facial Expressions: The State of the Art. IEEE Trans. Pattern Analysis and Machine Intelligence, 22(12): 1424-1445, 2000.

[SAND10] K. E. A. van de Sande, T. Gevers, and C. G. M. Snoek. Evaluating color descriptors for object and scene recognition. IEEE Trans. Pattern Analysis and Machine Intelligence, 2010. In press.

[SIVI03] J. Sivic and A. Zisserman. Video Google: A Text Retrieval Approach to Object Matching in Videos. In Proc. IEEE International Conference on Computer Vision, 2003.

[SMEU00] A. W. M. Smeulders, M. Worring, S. Santini, A. Gupta, and R. Jain. Content Based Image Retrieval at the End of the Early Years. IEEE Trans. Pattern Analysis and Machine Intelligence, 22(12):1349-1380, 2000.

[SNOE08] C. G. M. Snoek, et al., The MediaMill TRECVID 2008 Semantic Video Search Engine, in Proceedings of the 6th TRECVID Workshop, Gaithersburg, USA, 2008.

[PARK10] U. Park, Y. Tong, and A. K. Jain. Age-Invariant Face Recognition. IEEE Trans. Pattern Analysis and Machine Intelligence, 32(5): 947-954, 2010.

[TOEW09] M. Toews and T. Arbel. Detection, Localization, and Sex Classification of Faces from Arbitrary Viewpoints and under Occlusion. IEEE Trans. Pattern Analysis and Machine Intelligence, 31(9):1567-1581, 2009.

[TUYT08] T. Tuytelaars and K. Mikolajczyk. Local invariant feature detectors: A survey. Foundations and Trends in Computer Graphics and Vision, 3(3):177-280, 2008.

[VAPN00] V. N. Vapnik. The Nature of Statistical Learning Theory. Springer-Verlag, New York, USA, 2nd edition, 2000.

[YANG02] M.-H. Yang and D. J. Kriegman and N. Ahuja. Detecting Faces in Images: A Survey. IEEE Trans. Pattern Analysis and Machine Intelligence, 24(1):34-58, 2002.

[ZHAN07] J. Zhang, M. Marszalek, S. Lazebnik, and C. Schmid. Local features and kernels for classification of texture and object categories: A comprehensive study. Int'l J. Computer Vision, 73(2):213-238, 2007.

[ZHAO03] W. Zhao and R. Chellappa and P. J. Phillips and A. Rosenfeld. Face Recognition: A Literature Survey. ACM Computing Surveys, 35(4): 399-458, 2003.

What is claimed is:

1. A method for automated categorization of human face images based on facial traits, said method comprising a facial trait extracting phase, comprising:
    detecting a face in an image, and cropping the image around the face,
    for the image, sampling a multitude of points in the image to obtain point sample data,
    for each sampled point, extracting visual color features from said point sample data,
    for the image, assigning said visual color features to predefined codewords by applying a face specific codebook transform, wherein each point in said point sample data is weighted based on a location of said point within said face, and wherein the face specific codebook transform is applied based at least in part on weighting of said points, and
    extracting for the image facial traits by applying a kernel-based learning method's prediction algorithm to said codewords to establish the probability that a facial trait from a predefined set of facial traits is present in the image.

2. The method of claim 1, wherein obtaining said point sample data is achieved by using an interest point detector such as a Harris-Laplace detector, a dense point detector and/or spatial pyramid weighting.

3. The method of claim 1, wherein extracting visual color features from said point sample data is achieved by detecting Color SIFT features in said point sample data.

4. The method of claim 1, wherein said kernel-based learning method algorithm is a support vector machine, preferably a LIBVSM support vector machine with $\chi 2$ kernel.

5. The method of claim 1, wherein said points in the image are pixels of a digital image or a video frame.

6. The method of claim 1, wherein said method further comprises detecting multiple faces in an image, creating a new image for each detected face, rotating the new images to align the detected faces.

7. The method of any of claim 5, wherein said method further comprises labeling said new images with said extracted facial traits and sorting said new images based on said extracted facial traits, after said facial traits have been extracted.

8. The method of claim 1, wherein said method includes a learning phase preceding said facial trait extraction phase, comprising:
    providing a learning multitude of digital images comprising human faces, each of said images having a similar facial trait that is to be used to categorize the image in said facial trait extraction phase,
    for each image of said multitude of digital images sampling a multitude of points in said image to obtain point sample data,
    for each sampled point extracting visual features from said point sample data,
    for each image of said multitude of digital images assigning said visual features to predefined codewords by applying a codebook transform, wherein each point in said point sample data is weighted based on a location of said point within said face, and wherein the codebook transform is applied based at least in part on weighting of said points,
    for each image of said multitude of digital images applying said kernel-based learning method's training algorithm to said codewords for said facial trait.

9. The method of claim 8, wherein said learning phase is repeated for a multitude of facial traits that are to be used to categorize the image in said facial trait extraction phase.

10. A non-transitory computer readable storage medium including instructions that, when executed by a processor, cause the processor to perform a method for automated categorization of human face images based on facial traits, said method comprising a facial trait extracting phase, comprising:
    detecting a face in an image, and cropping the image around said face,
    for the image, sampling a multitude of points in the image to obtain point sample data,
    for each sampled point, extracting visual features from said point sample data,
    for the image, assigning said visual color features to predefined codewords by applying a face specific codebook transform, wherein each point in said point sample data is weighted based on a location of said point within said face, and wherein the face specific codebook transform is applied based at least in part on weighting of said points, and extracting for the image, facial traits by applying a kernel-based learning method's prediction algorithm to said codewords to establish the probability that a facial trait from a predefined set of facial traits is present in the image.

11. A computer readable data carrier comprising a non-transitory computer readable medium including instructions that, when executed by the processor, cause the processor to perform a method for automated categorization of human face images based on facial traits, said method comprising a facial trait extracting phase, comprising:

detecting a face in an image, and cropping the image around said face, for the image, sampling a multitude of points in the image to obtain point sample data, for each sampled point, extracting visual color features from said point sample data, for the image, assigning said visual color features to predefined codewords by applying a face specific codebook transform, wherein each point in said point sample data is weighted based on a location of said point within said face, and wherein the face specific codebook transform is applied based at least in part on weighting of said points, and extracting for the image, facial traits by applying a kernel-based learning method's prediction algorithm to said codewords to establish the probability that a facial trait from a predefined set of facial traits is present in the image.

12. A computer system comprising a processor and an electronic memory connected thereto loaded with a non-transitory computer readable medium including instructions that, when executed by the processor, cause the processor to perform a method for automated categorization of human face images based on facial traits, said method comprising a facial trait extracting phase, comprising:

detecting a face in an image, and cropping the image around said face, for the image, sampling a multitude of points in the image to obtain point sample data, for each sampled point, extracting visual color features from said point sample data, for the image, assigning said visual color features to predefined codewords by applying a face specific codebook transform, wherein each point in said point sample data is weighted based on a location of said point within said face, and wherein the face specific codebook transform is applied based at least in part on weighting of said points, and extracting for the image, facial traits by applying a kernel-based learning method's prediction algorithm to said codewords to establish the probability that a facial trait from a predefined set of facial traits is present in the image.

* * * * *